United States Patent [19]

Masaki

[11] Patent Number: 5,062,118
[45] Date of Patent: Oct. 29, 1991

[54] ELECTRIC MELTING FURNACE FOR VITRIFYING WASTE

[75] Inventor: Toshio Masaki, Hitachi, Japan

[73] Assignee: Doryokuro Kakunenryo Kaihatsu Jigyodan, Tokyo, Japan

[21] Appl. No.: 524,052

[22] Filed: May 16, 1990

[30] Foreign Application Priority Data

May 20, 1989 [JP] Japan .................................. 1-126887

[51] Int. Cl.⁵ .............................................. C03B 5/027
[52] U.S. Cl. ....................................... 373/41; 373/27; 373/29; 373/36; 373/39
[58] Field of Search .................... 373/27, 29, 36, 37, 373/38, 39, 41, 109; 266/30, 104

[56] References Cited

U.S. PATENT DOCUMENTS

| | | | |
|---|---|---|---|
| 2,749,378 | 3/1959 | Penberthy | 373/41 |
| 4,143,232 | 3/1979 | Bansal et al. | 373/41 |
| 4,782,497 | 11/1988 | Sasaki et al. | 373/29 |

OTHER PUBLICATIONS

Horst Wiese, "Industrial Vitrification of High Level Liquid Waste with the Pamela Plant in Belgium", Sep. 1988, p. 76.

"Development of Glass Melter for the PNC Tokai Vitrification Facility", Shin-Ichiro Torata, Sep. 1988, p. 82.

Primary Examiner—Bruce A. Reynolds
Assistant Examiner—Tu Hoang
Attorney, Agent, or Firm—Wenderoth, Lind & Ponack

[57] ABSTRACT

An electric melting furnace for vitrifying waste, having a melting tank having walls of refractory bricks, the melting tank being provided at the upper portion thereof with a supply port for a glass additive and waste and at the bottom portion thereof with a discharge port for molten glass containing the waste; at least a pair of side electrodes horizontally provided on opposite side walls of the melting tank; and at least one central electrode having a polarity opposite to that of the side electrodes, the central electrode being horizontally positioned in the interior of the melting tank at substantially the middle portion between the side electrodes. By such melting furnace construction, as described above, the heating current selectively flows through between the side electrodes and the central electrode, and does not flow electrically conductive substances deposited on the furnace bottom.

13 Claims, 3 Drawing Sheets ically the middle portion between the side elec-
ELECTRIC MELTING FURNACE FOR VITRIFYING WASTE

BACKGROUND OF THE INVENTION

The present invention relates to an electric melting furnace used to vitrify waste by utilizing Joule heat, and more particularly to a waste vitrifying electric melting furance provided with electrodes at least in the center of the interior of a melting tank and on the side walls therein.

This melting furnace is used for the vitrification of various kinds of industrial waste, especially, for the vitrification of high radioactive level liquid waste.

In a conventional waste vitrifying electric melting furnace, a furnace body and a melting tank are made of refractory bricks, and one or a plurality of pairs of electrodes consisting of a heat-resistant metal (alloy) or a metallic oxide are provided on the side walls in the melting tank.

An electric current is applied to molten glass in the melting tank via the electrodes by utilizing the electric conductivity of the molten glass, to generate Joule heat which heats the molten glass. When radioactive liquid waste and glass additive are supplied from the upper portion of the melting furnace to the surface of the molten glass in the furnace, they are heated with the molten glass to turn to molten glass through a temperature increasing step, an evaporation step and a calcination step.

The soundness of the refractory bricks constituting the melting furnace and the material of the electrodes depend upon the temperature of the molten glass which contacts these materials. Accordingly, it is desirable that the temperature distribution of the molten glass in the furnace be kept uniform. In order to meet this requirement, various configurations of the electrodes have been adopted for trial in accordance with the shape of the furnace and the quantity of the waste to be treated.

In recent years, the treatment of high radioactive level liquid waste involves a problem that an abnormal temperature rise occurs in the bottom portion of the furnace and a decrease of the waste treatment capacity occurs. This is ascribable to the following. The elements of the platinum group, such as ruthenium, palladium and rhodium contained in the high radioactive level liquid waste form electrically conductive substances which are difficult to dissolve in the molten glass and are deposited at the bottom of the furnace. Since the electric current flowing between the electrodes is concentrated on the conductive deposit, the Joule heat generated in the molten glass is not supplied sufficiently to the surface of the molten glass above the conductive deposit.

For example, it has been reported that, when conductive substances having an electric resistance ⅛ times as high as that of a regular glass, and consisting of elements of the platinum group deposited 5 cm deep in a furnace bottom, the electric characteristics of the molten glass changed to cause the glass throughput capacity to decrease from 30 kg/hr to 20 kg/hr (Horst Wiese, "Industrial Vitrification of High Level Liquid Waste with The PAMERA Plant in Belgium" in and Hazardous Waste Management SPECTRUM '88 held in Pasco, Washington, U.S.A. on Sept. 11-15, 1988, page 76).

It has also been reported that the results of several experiments conducted by using a laboratory-scale melting furnace having an inclined furnace bottom showed that a furnace bottom having an angle of inclination of 45° was effective for the discharging of the conductive deposit consisting of elements of the platinum group, and further reported that this effect was confirmed by the results of experiments conducted by using a full-size melting furnace having the furnace bottom of the same angle of inclination (Shin-ichiro Torata, "Development of Glass Melter for PNC Tokai Vitrification Facility" in the proceedings of the same meeting as above-described, page 82).

However, in a conventional melting furnace, it is anticipated that a small quantity of conductive substances will be deposited on the bottom portion or inclined surfaces of the glass melting furnace in spite of the inclined furnace bottom. In such a case, it is possible that the above-mentioned phenomena, i.e. the electric abnormality or a decrease in the waste treatment capacity, occur. Such inconveniences occur because the electric current flowing between the side electrodes constitutes the supply source of heating current in the conventional melting furnace, and the electric current necessarily flows from one side electrode to the other via the conductive deposit on one inclined surface, the conductive deposit on the furnace bottom and the conductive deposit on the other inclined surface. Consequently, abnormal heat is generated in the vicinity of the furnace bottom, and the heating current density at the upper portion of the molten glass decreases. This causes a decrease in the waste treatment capacity to occur.

SUMMARY OF THE INVENTION

An object of the present invention is to provide a waste vitrifying electric melting furnace adapted to vitrify industrial waste without causing electric troubles and a decrease in the waste treatment capacity even when the waste to be vitrified contains elements of the platinum group.

According to the present invention, there is provided an electric melting furnace for vitrifying waste comprising a melting tank having walls of refractory bricks. The melting tank is provided at the upper portion thereof with a supply port for a glass additive and waste to be treated and at the bottom portion thereof with a discharge port for molten glass containing the waste. At least a pair of side electrodes are horizontally provided on opposite side walls of the melting tank. At least one central electrode which has a polarity opposite to that of the side electrodes is horizontally positioned in the interior of the melting tank at the substantially middle portion between the side electrodes.

Preferably, the central electrode is positioned in substantially the same horizontal plane as the side electrodes. The position of the central electrode may, of course, be changed vertically in a suitable range wherein proper electric characteristics can be provided.

The walls of the melting tank are formed by piling various kinds of refractory bricks. Usually, the walls which contact with a molten glass are formed of corrosion-resistant refractory bricks, and the walls on the outer side thereof with backup bricks and various kinds of insulating bricks. The resultant structure is covered with a metallic casing so as to maintain the structure and strength thereof. The melting furnace thus formed has a high corrosion resistance, a high refractoriness, a high strength and excellent heat insulating characteristics.

A more preferable construction of this melting furnace is as follows. The bottom wall of the melting tank which contacts with the molten glass, is inclined at around 30° to 60° toward the molten glass discharge port disposed in the center of the bottom portion of the melting tank. A bottom electrode the polarity of which is opposite to that of the central electrode is provided at the bottom portion of the melting tank. These electrodes are made of a heat-resistant alloy, and cooling means consisting of cooling gas pipes are provided therein. The vertical distance between the side electrodes and the bottom electrode is set not less than ½ of the horizontal distance between the side electrodes.

In operation, an electric current is applied to the molten glass in the melting tank via the electrodes to generate Joule heat, with which the molten glass is heated. In the melting furnace according to the present invention, an electric current flows between one of the side electrodes and the central electrode, and between the other of the side electrodes and the central electrode. Therefore, even when a considerable amount of conductive substances are deposited in the furnace, the heating current selectively flows between the side electrodes and the central electrode, and does not flow to the deposited conductive substances.

When the central and side electrodes are positioned near the surface of the molten glass in the melting tank, the rate of generation of heat in the surface portion of the molten glass becomes high. As a result, the rate of supplying heat to the waste and glass additive can be increased, and the waste treatment capacity can also be improved.

When the bottom electrode is provided, an electric current flows between the central and bottom electrodes to generate heat. This enables the generation of heat at the furnace bottom to be promoted, and the temperature distribution of the molten glass as a whole in the furnace to be made uniform. It is considered that conductive substances will deposit on the bottom electrode. However, the central electrode the polarity of which is opposite to that of the bottom electrode is positioned within the molten glass which is away from the bottom wall and the side walls of the furnace. Therefore, the electric current flows to the conductive substances which are on the bottom electrode, and which serve as parts of the bottom electrode, but it does not flow to the conductive substances deposited on the other walls of the melting tank.

In the case where each of these electrodes is made of a heat-resistant alloy and cooled with cooling means, the lifetime of the electrode is prolonged.

By inclining the bottom wall of the melting tank at around 30° to 60°, even when the conductive substances which are difficult to be dissolved in the molten glass are formed by elements of the platinum group contained in the waste, they can be discharged easily.

If the vertical distance between the side electrodes and the bottom electrode is set not less than ½ of the distance between the side electrodes, the heating current can be prevented from flowing selectively to the conductive deposit even when a small amount of conductive substances are deposited in spite of the provision of the inclined bottom wall of the melting tank.

PREFERRED EMBODIMENTS OF THE INVENTION

Figure 1:
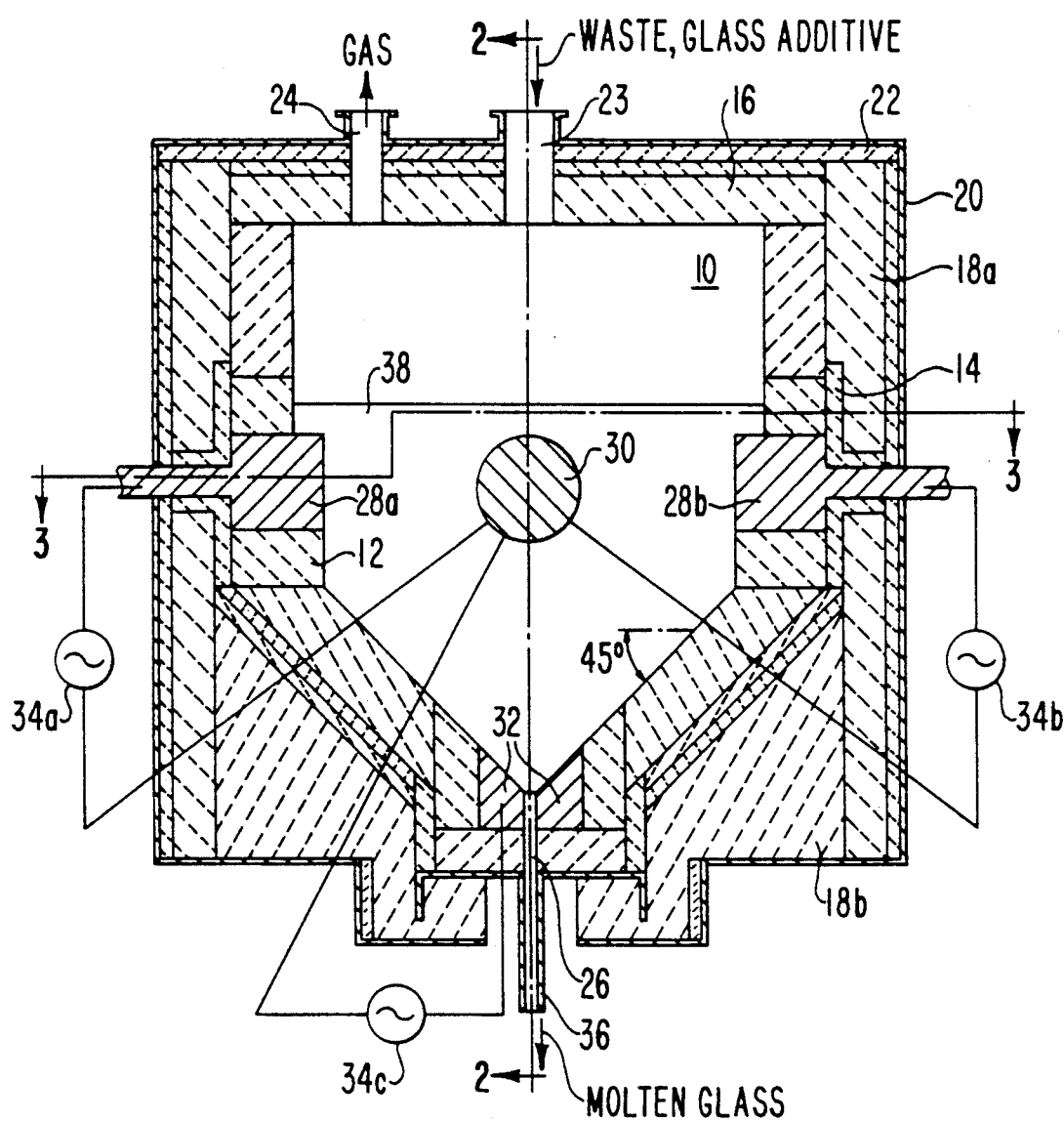
FIG. 1 is a sectioned front elevation of an embodiment of the waste vitrifying electric melting furnace according to the present invention.
Figure 2:
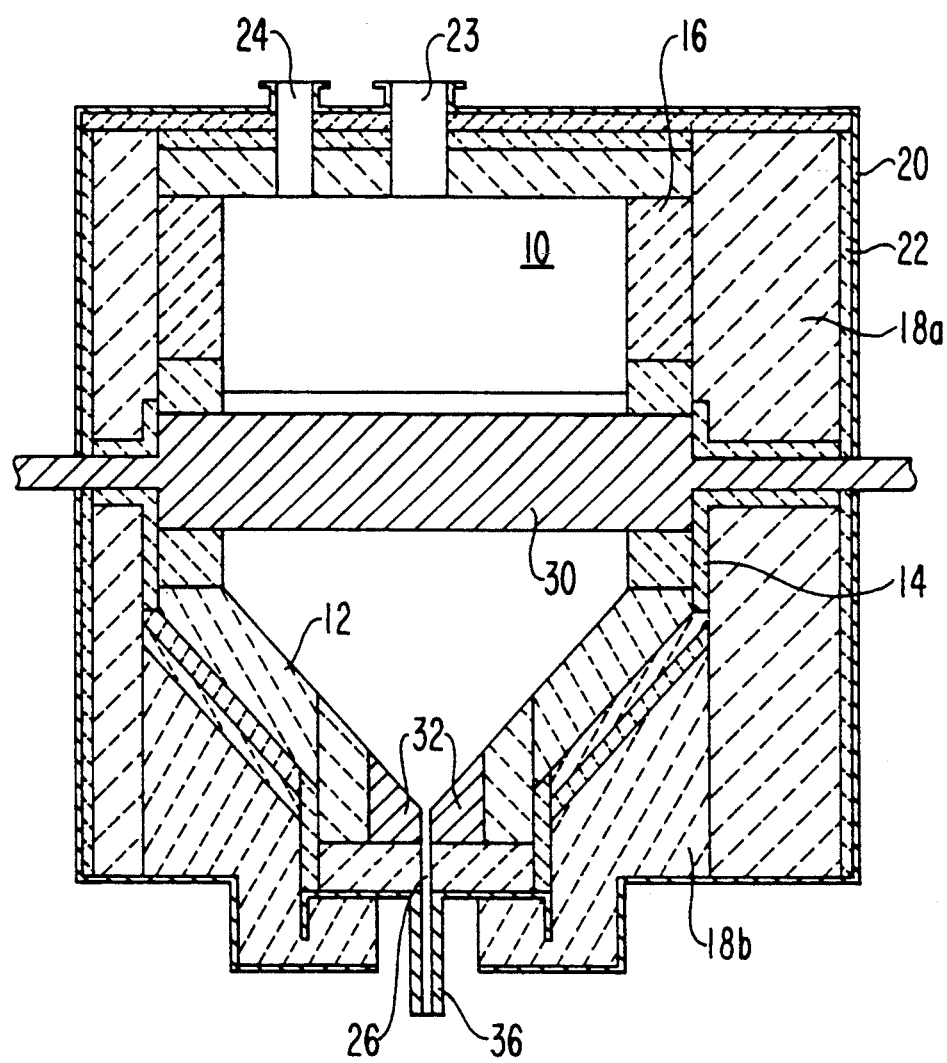
FIG. 2 is a sectional view taken along the line arrows 2—2 in FIG. 1.
Figure 3:
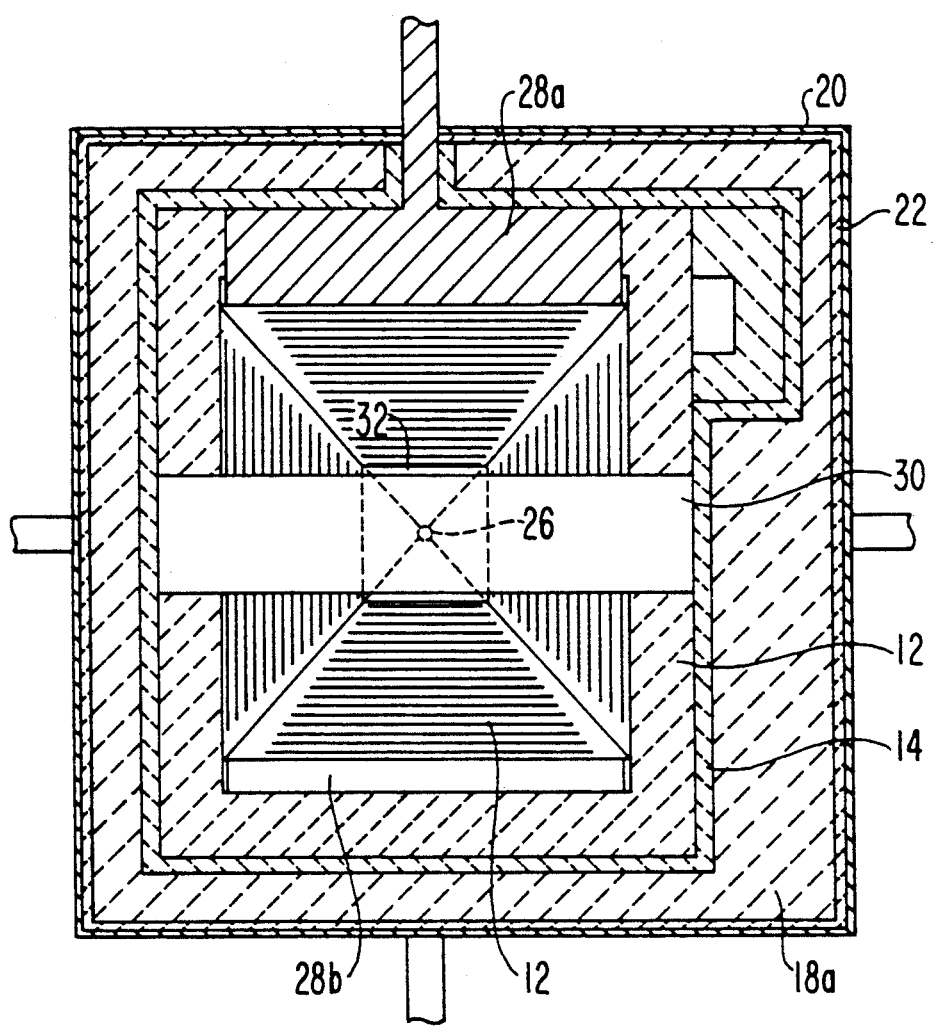
FIG. 3 is a sectional view taken along the line arrows 3—3 in FIG. 1.

The accompanying drawings show an embodiment of a waste vitrifying electric melting furnace according to the present invention.

A melting tank 10 has walls which contact with a molten glass and other walls which contact with an upper space in the melting tank 10. The molten glass-contacting walls are formed with corrosion-resistant refractory bricks 12 and backup refractory bricks 14, and the upper space-contacting walls with refractory bricks 16. On the outer side of these bricks, insulating bricks 18a, 18b are arranged, and the furnace as a whole is covered with a metallic casing 20. An expansion absorbing member 22 for absorbing the expansion of the various kinds of bricks which is caused by a temperature rise is provided between the insulating bricks 18a at the upper and side portions of the melting furnace and the metallic casing 20.

The melting tank 10 is provided at its upper portion with a raw material supply port 23 through which waste to be treated and glass additive are fed, and a gas exhaust port 24 from which a gas generated during the treatment of the waste is discharged. The melting tank 10 is also provided at its bottom portion with a molten glass discharge port 26.

Side electrodes 28a, 28b are horizontally provided on the portions of the opposite side walls which correspond to the molten glass-contacting portion of the walls of the melting tank 10. It is possible that a plurality of pairs of side electrodes can be provided. A central electrode 30 the polarity of which is opposite to that of the side electrodes 28a, 28b is horizontally positioned in the interior of the melting tank 10 at substantially the mid-point between the side electrodes so that the central electrode 30 is in substantially the same horizontal plane as the side electrodes 28a, 28b. A plurality of such central electrodes may be provided. The portion of the melting tank 10 which extends from the side walls to the bottom portion thereof is constructed as follows. Vertical portions of a small height are provided so as to extend from the lower ends of the side electrodes 28a, 28b in the downward direction. The portions of the walls which extend from the lower ends of these vertical portions toward the molten glass discharge port 26 are inclined at 30° to 60° and more preferably at 45°, and a bottom electrode 32 is provided on the inner side of the extensions of the surfaces of these inclined walls.

These three kinds of electrodes are formed to such dimensions that enable the molten glass to be heated to a required temperature. In order to cool these electrodes, air or the like may be passed through pipes provided therein (not shown in the drawings).

The heating power circuits consist of three circuits, i.e. a heating AC power source 34a between the side electrode 28a and central electrode 30, a heating AC power source 34b between the side electrode 28b and central electrode 30, and a heating AC power source 34c between the bottom electrode 32 and the central electrode 30. These three circuits are capable of electrically controlling the melting furnace by their constant power controlling function, constant current controlling function, constant voltage controlling function and the like. This enables the molten glass to be maintained at a suitable temperature, and a uniform temperature distribution to be attained.

A drain nozzle 36 communicated with the molten glass discharge port 26 is provided below the bottom electrode 32. The molten glass is discharged from the drain nozzle 36 via the discharge port 26 provided in the bottom electrode 32 and the corrosion-resistant refractory bricks. This drain nozzle 36 consists of a sleeve of a heat-resistant alloy, and is adapted to be heated by induction-heating by a heating coil provided therein (not shown), or by applying an electric current directly thereto, whereby the starting and stopping of a downward flow of the molten glass are controlled.

In this melting furnace, the molten glass 38 is heated substantially in the same manner as in a conventional melting furnace, i.e. by applying an electric current to the molten glass 38 in the melting tank 10 through the electrodes 28a, 28b, 30, 32 by utilizing the electric conductivity of the molten glass, to generate Joule heat, with which the molten glass is heated. When radioactive liquid waste and glass additive are fed through the supply port 23 at the upper portion of the melting furnace 10 onto the surface of the molten glass, they are heated with the molten glass to turn into molten glass through a temperature increasing step, an evaporation step and a calcination step, the resultant molten glass being discharged from the discharge port 26. The waste gas occurring during the melting treatment is discharged from the exhaust port 24.

According to the present invention described above, side electrodes are provided on the side walls of the melting tank, and a central electrode the polarity of which is opposite to that of the side electrodes is set in substantially the central portion of the interior of the melting tank. Therefore, even when electrically conductive substances are deposited on the bottom portion of the melting tank, the heating electric current does not flow thereto since the electric current flows selectively between the side electrodes and central electrode. This can prevent the generation of abnormal heat at the furnace bottom. The heat generated by the electric current flowing between the side electrodes and the central electrode is supplied efficiently to the waste and glass additive on the surface of the molten glass, so that the waste treatment capacity is increased. This enables the melting furnace to be miniaturized.

When a bottom electrode is provided at the furnace bottom, flowing of an electric current between the central electrode and the bottom electrode becomes possible, so that an operation of controlling the temperature of the molten glass in the furnace can be carried out more easily than that in a melting furnace of a conventional construction. Therefore, the temperature distribution of the molten glass in the furnace can be made uniform. This enables a waste treatment operation including an operation of effecting a downward flow of molten glass to be controlled easily, and uniform waste-containing glass to be produced. Since the furnace bottom is inclined to increase the temperature thereof, the conductive deposit is discharged smoothly in accordance with the downward flow of the molten glass. Accordingly, the possibility of occurrence of bad electric influence of the conductive deposit upon the waste treatment operation further decreases.

What is claimed is:

1. An electric melting furnace for vitrifying waste comprising:
   a melting tank having walls of refractory bricks, said melting tank being provided at an upper portion thereof with a supply port for a glass additive and waste and at a bottom portion thereof with a discharge port for molten glass containing the waste;
   at least a pair of side electrodes mounted on opposite side walls of said melting tank in the same horizontal plane; and
   at least one central electrode having a polarity opposite to that of said side electrodes, said central electrode being horizontally positioned in the interior of said melting tank at a middle portion thereof between said side electrodes.

2. The electric melting furance according to claim 1, wherein said central electrode is positioned in substantially the same horizontal plane as said side electrodes.

3. The electric melting furance according to claim 1 or 2, wherein the bottom portion of said melting tank comprises a bottom wall inclined at around 30° to 60° toward said discharge port in the center of the bottom wall.

4. The electric melting furance according to claim 3, further comprising a bottom electrode having a polarity of which is opposite to that of said central electrode provided at the bottom portion of said melting tank.

5. The electric melting furance according to claim 4, wherein a vertical distance between the side electrodes and the bottom electrode is not less than ½ of a horizontal distance between said side electrodes.

6. The electric melting furance according to claim 1 or 2, wherein each of said electrodes are made of a heat-resistant alloy and are provided with cooling means therein.

7. The electric melting furance according to claim 1 or 2, further comprising a bottom electrode having a polarity of which is opposite to that of said central electrode provided at the bottom portion of said melting tank.

8. The electric melting furance according to claim 7, wherein a vertical distance between the side electrodes and the bottom is not less than ½ of a horizontal distance between said side electrodes.

9. The electric melting furance according to claim 3, wherein each of said electrodes are made of a heat-resistant alloy and are provided with cooling means therein.

10. The electric melting furance according to claim 4, wherein each of said electrodes are made of a heat-resistant alloy and are provided with cooling means therein.

11. The electric melting furance according to claim 5, wherein each of said electrodes are made of a heat-resistant alloy and are provided with cooling means therein.

12. The electric melting furance according to claim 7, wherein each of said electrodes are made of a heat-resistant alloy and are provided with cooling means therein.

13. The electric melting furance according to claim 8, wherein each of said electrodes are made of a heat-resistant alloy and are provided with cooling means therein.

* * * * *